INVENTORS
WILLIAM H. BELKE
WILLIAM E. STREIGHT

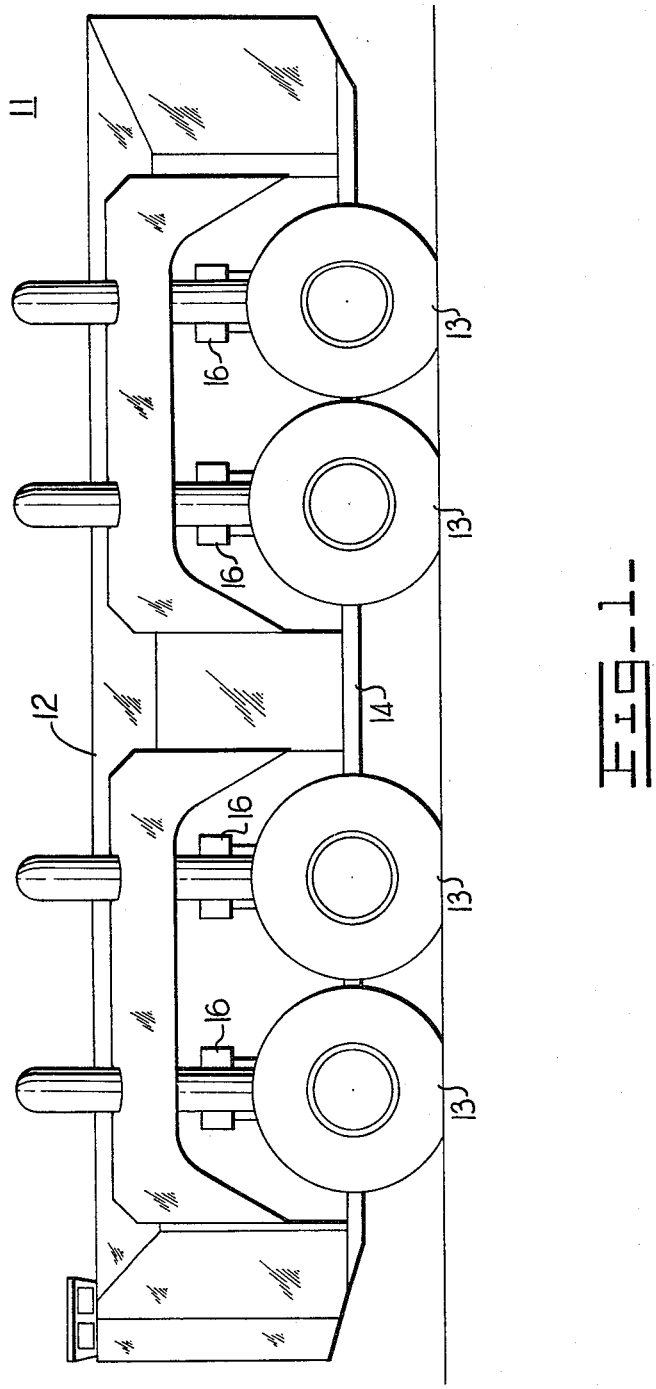

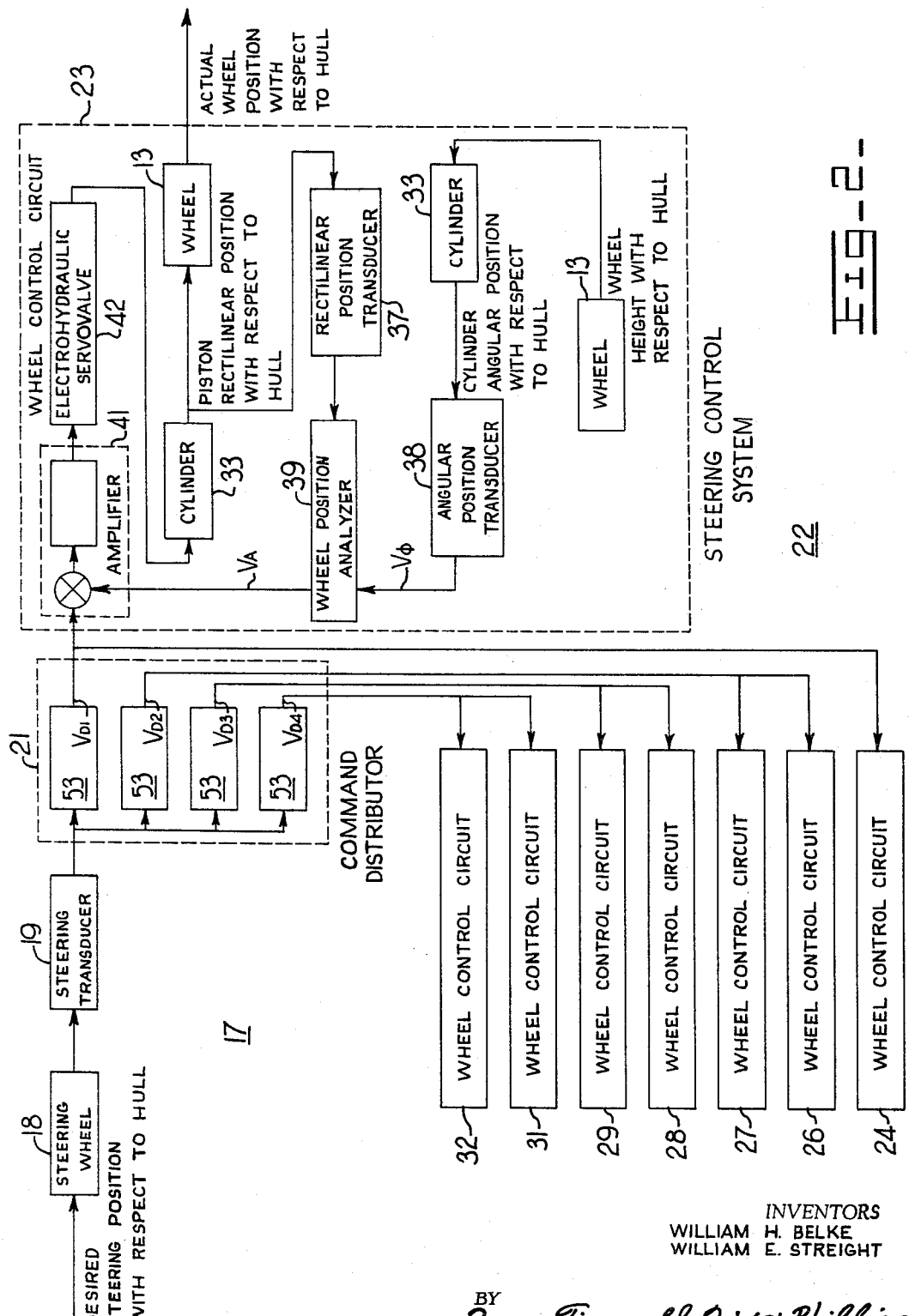

ATTORNEYS

June 11, 1968  W. H. BELKE ET AL  3,387,684
ELECTRONIC STEERING CIRCUIT FOR LARGE VEHICLES
Filed March 13, 1967  4 Sheets-Sheet 4
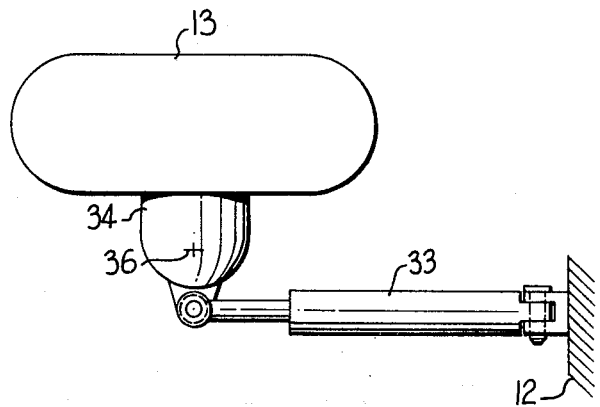
Fig-5-
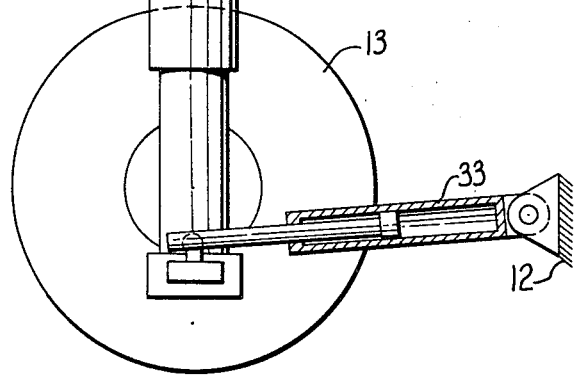
Fig-6-
INVENTORS
WILLIAM H. BELKE
WILLIAM E. STREIGHT
BY
ATTORNEYS

United States Patent Office 3,387,684
Patented June 11, 1968

3,387,684
ELECTRONIC STEERING CIRCUIT
FOR LARGE VEHICLES
William H. Belke, Peoria, and William E. Streight, East Peoria, Ill., assignors to Caterpillar Tractor Co., Peoria, Ill., a corporation of California
Filed Mar. 13, 1967, Ser. No. 622,654
6 Claims. (Cl. 180—79.2)

ABSTRACT OF THE DISCLOSURE

Apparatus providing accurate tracking in a large vehicle having multiple wheel assemblies independently suspended from the vehicle hull. Steering means operable to select a direction of vehicle travel and generate electrical signals corresponding to the selected direction of travel. Control means responsive to steering means signals to properly position each wheel for tracking.

Background of the invention

In large vehicles, particularly off-road vehicles such as missile carriers, it is desirable to provide control means operable by a single operator to achieve accurate tracking whereby the entire vehicle follows a single path of travel. Such vehicles have commonly been provided with an articulated tractor at either end of the vehicle having a separate operator controlling each tractor. Alternately, a single operator controlled the forward tractor with steering of the rear tractor electronically controlled according to the forward tractor. However, a need still remained for means to provide accurate tracking in a vehicle having multiple independently suspended wheels.

Summary of the invention

The present invention provides electronic steering apparatus, in a vehicle having wheel assemblies independently suspended from a load carrying hull, to control accurate tracking of the vehicle wheels. Steering means are operably disposed for selecting a direction of vehicle travel and generating multiple electrical signals corresponding to the selected direction of travel. Control means are operably coupled to receive the steering means signals and thereupon individually position each wheel normal to an axial line from the wheel to a center point P of a circumferential path along which the vehicle is to travel.

Brief description of the drawings

FIGURE 1 is an elevational view of a large off-road missile carrier, showing wheel assemblies and struts by which each wheel is independently suspended from the vehicle hull.

FIGURE 2 is a schematic illustration of the electronic steering circuit of the invention.

FIGURE 5 is a plan view showing the connection of the positioning hydraulic cylinder between a wheel assembly and the hull.

FIGURE 6 is an elevation view of the components of FIGURE 5 and a strut associated with the therein illustrated wheel.

Description of the preferred embodiments

Figure 4:
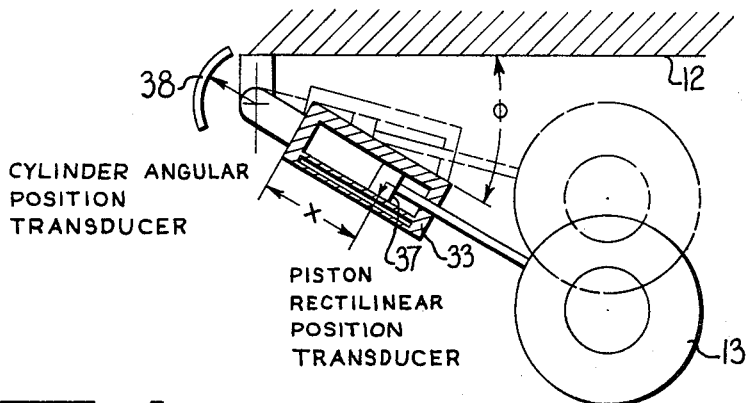
FIGURE 4 is a partial elevation view of a positioning hydraulic cylinder and transducers associated with each wheel assembly.

Referring to FIGURE 1, an off-road missile carrier 11 includes eight wheels 13 (four of which are shown) disposed on either side of a load carrying hull 12 and generally symmetrical about the longitudinal center of the hull indicated at 14. Each wheel 13 is independently suspended from hull 12 by a strut 16. Struts 16 are of a common type permitting or causing each wheel 13 to individually raise or lower with respect to the vehicle hull. Such struts are employed to provide springing and shock absorbing action, to maintain the vehicle hull in a horizontal position while traveling over uneven terrain or to compensate for uneven load distribution. For details of a particular example of strut 16, see U.S. Patent No. 3,128,089, entitled "Suspension and Height Control System for Vehicles" filed Aug. 25, 1961, by R. A. Burris et al.

Figure 3:
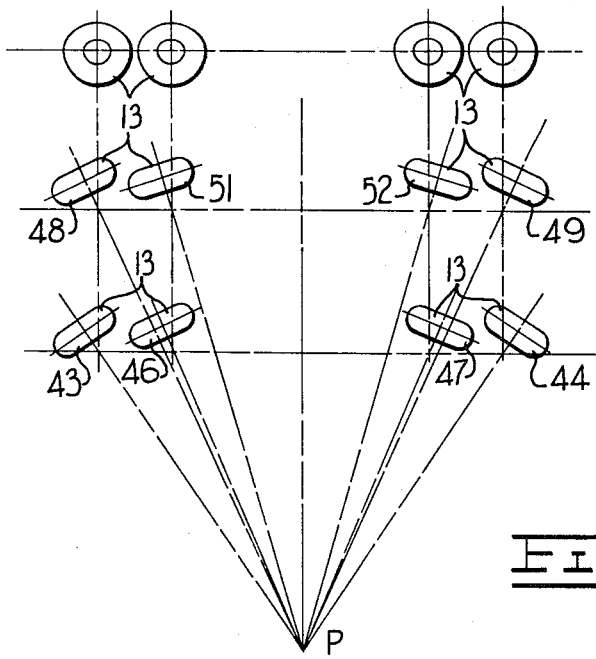
FIGURE 3 is a plan view of a typical configuration of the wheels individually pivoted for tracking along a path about central point P.

When the direction of travel of vehicle 11 is to be changed, it is necessary to provide for accurate tracking of wheels 13 and assure single operator control over the vehicle. Referring also to FIGURE 3, vehicle 11 is to travel along a circumferential path about center point P. It is to be noted that such operation includes vehicular travel even in a straight line if P is spaced away from vehicle 11 at an infinite distance. To provide tracking about point P, the steering apparatus of the present invention assures that each wheel 13 is maintained normal to a line running from point P to the center of that wheel.

To provide for operator control according to the above manner of operation, steering means 17 (see FIGURES 2 and 4) preferably comprises a steering column 18, an angular steering transducer 19 and an electronic command distributor 21. As the operator turns steering wheel 18 in the usual manner to select a direction of travel, steering transducer 19 generates an electrical signal corresponding to the degree of turning of steering wheel 18 from some reference point. Command distributor 21 receives the transducer signal and generates a plurality of signals, $V_D$, each being some function of the transducer circuit signal.

Wheel control means 22 are disposed to receive the signals $V_D$ and respond thereto by maintaining each wheel 13 normal to an axial line from point P. Wheel control means 22 includes a plurality of wheel control circuits 23, 24, 26, 27, 28, 29, 31, and 32, wherein each circuit is associated with one of wheels 13. An electrohydraulic positioning means (described below) is associated with each wheel and causes that wheel to assume a particular tracking position with respect to the hull 12.

Referring to FIGURES 4, 5 and 6, wheels 13 are suspended from hull 12 by struts 16 to permit individual raising and lowering of wheels 13 with respect to hull 12. Further, axle 34 of each wheel 13 is mounted to pivot with respect to hull 12 in a generally horizontal plane about an axis 36 which is coextensive with the axis of strut 16. An electro-hydraulic cylinder 33 is pivotally connected between wheel axle 34 and hull 12 and operates to control the tracking position of wheel 13 by extending or retracting.

Because of the connection between strut 16 and cylinder 33, the amount of extension of hydraulic cylinder 33 is not an accurate measure of the tracking angle of wheel 13. This is due to the fact that the raising and lowering of each wheel 13 by strut 16 will necessarily be accompanied by extension or retraction of hydraulic cylinder 33.

To provide for accurate tracking of each wheel 13, independent of the operation of strut 16 as noted above, each wheel control circuit 23 includes both a rectilinear position transducer 37 and an angular position transducer 38. Rectilinear transducer 37 is operatively associated with cylinder 33 and generates an electrical signal $V_X$ which corresponds to the amount of extension or retraction of the cylinder 33 from a given length. Angular position transducer 38 is also operatively associated with cylinder 33 and generates an electrical signal $V_\phi$ which corresponds to angular position of cylinder 33 with respect to hull 12, in a generally vertical plane. Wheel position analyzer 39 receives signals $V_X$ and $V_\phi$ and generates an electrical signal $V_A$ which is a function of both signals $V_X$ and $V_\phi$. Signal $V_A$ thus accurately corresponds to the actual tracking position of wheel 13.

An operational amplifier 41 receives both signal $V_A$ and a signal $V_D$ and responds to a difference therebetween to generate an actuating signal which is directed to a servo-valve 42. Servo-valve 42 operates hydraulic cylinder 33 to correct the tracking position of wheel 13 in a direction which eliminates the difference between signals $V_D$ and $V_A$.

With the preferred symmetrical disposition of wheels 13 along hull 12, an angular relationship exists between pairs of wheels 13 wherein the wheels have the same angle relative to hull 12 but in opposite directions. Such a relationship exists between wheels 43 and 44, wheels 46 and 47, wheels 48 and 49, and between wheels 51 and 52. Thus, the absolute value by which the tracking angle of each wheel of such a pair is the same. Thus, it is only necessary in this configuration for command distributor 21 to have four function generators 53 since there are only four different absolute tracking angles.

Although the present invention is described with respect to a symmetrical wheel distribution, each wheel 13 may also be required to assume a separate and distinctly different tracking angle with respect to hull 12. Such a situation arises when the vehicle hull is designed for uneven load distribution and wheels 13 are accordingly disposed in non-symmetrical relation along vehicle hull 12. In such a non-symmetrical configuration, a separate function generator 53 and a separate signal $V_D$ is provided in command distributor 21 for each wheel. Electronic components included in the above description are well known in the prior art.

What is claimed is:

1. Electronic steering apparatus, in a vehicle having multiple wheel assemblies independently suspended from a vehicle hull, to provide accurate tracking of the vehicle wheels along a circumferential path about a central point P, the position of point P varying according to the desired direction of travel, the combination comprising:
    steering means selecting a direction of vehicle travel and generating a plurality of electrical signals each being a function of the selected direction of travel; and
    control means coupled to said steering means to receive one of the steering means signals and operably connected to each wheel to maintain each wheel individually normal to an axial line from the wheel to the point P in response to one of the multiple electrical signals from said steering means.

2. Electronic steering apparatus according to claim 1 wherein said control means comprises
    a plurality of electronic wheel control circuits each individually associated with one of the wheel assemblies, each control circuit generating an actuating signal in response to one of the multiple signals from said steering means; and
    electro-hydraulic positioning means controlling each wheel to vary its tracking position with respect to the hull in response to the actuating signal from said electronic control circuit associated with that wheel.

3. Electronic steering apparatus according to claim 2 wherein each wheel is connected to the hull by a strut to permit each wheel to pivot in a horizontal plane and to be independently raised or lowered, wherein said electro-hydraulic positioning means are double-acting hydraulic cylinders each generally horizontally interacting between the hull and one of the wheels to independently control pivoting of each wheel with respect to the vehicle hull.

4. Electronic steering apparatus according to claim 3 wherein said steering means comprises:
    a steering column which is turned by an operator to select the direction in which the vehicle is to travel and thereby fix the point P about which the vehicle is to track;
    electronic transducing means operably connected to said steering column to generate an electrical signal in response to the turning of said steering column; and
    an electronic command distributor disposed to receive said transducer signal and thereupon generate a plurality of control signals $V_D$, each signal $V_D$ being indicative of the tracking position to be assumed by at least one wheel.

5. Electronic steering apparatus according to claim 4 wherein said electronic wheel control circuits each comprise:
    angular transducing means disposed to generate an electrical signal, $V_X$, according to the actual angular position of said associated hydraulic cylinder in a generally vertical plane;
    rectilinear transducing means disposed to generate an electrical signal, $V_\phi$, according to the actual extended condition of said associated hydraulic cylinder;
    an electronic function generator electrically connected to said angular and rectilinear transducing means to generate signal $V_A$ as a function of signals $V_X$ and $V_\phi$;
    an operational amplifier electrically connected to said control circuit function generator to receive signals $V_A$ and $V_D$ and generate the control circuit actuating signal as a function of signals $V_A$ and $V_D$.

6. Electronic steering apparatus according to claim 5 wherein said wheel assemblies comprise first, second, third and fourth pairs of right and left wheels, the first and second pairs of wheels being symmetrically disposed about the longitudinal hull center with respective relation to the fourth and third wheel pairs and further wherein:
    said electronic command distributor comprises first, second, third and fourth function generators generating first, second, third and fourth signals $V_D$; the first signal $V_D$ is received by said control circuits associated with the first and fourth left wheels, the second signal $V_D$ is received by said control circuit associated with the second and third left wheels, the third signal $V_D$ is received by said control circuits associated with the first and fourth right wheels, the fourth signal $V_D$ is received by said control circuits associated with the second and third right wheels.

References Cited

UNITED STATES PATENTS

| | | | |
|---|---|---|---|
| 2,756,066 | 7/1956 | Ludowici | 280—91 |
| 3,007,655 | 11/1961 | Criswell et al. | 244—50 |
| 3,166,143 | 1/1965 | Gonter et al. | 180—79.1 |
| 3,280,931 | 10/1966 | Cahill et al. | 180—79.1 |
| 3,314,690 | 4/1967 | Bunchak | 180—79.2 |

BENJAMIN HERSH, *Primary Examiner.*

L. D. MORRIS, JR., *Assistant Examiner.*